United States Patent Office 3,544,607
Patented Dec. 1, 1970

3,544,607
PROCESS FOR INHIBITING FAT DEGRADATION DURING STORAGE
William Kuster, 1211 Avondale Road, Hillsborough, Calif. 94010
No Drawing. Filed Apr. 17, 1967, Ser. No. 631,196
Int. Cl. A23d 5/04
U.S. Cl. 260—412.7         4 Claims

ABSTRACT OF THE DISCLOSURE

A method for storing animal by-products at room temperature by maintaining the by-product in an aqueous suspension with an inorganic acid at a pH of about 1–4.

---

This invention is directed to a process for inhibiting the deterioration of fat contained in animal by-products during the storage thereof. More particularly, the invention relates to providing novel storage conditions for animal by-products prior to hydrolytic treatment commonly employed to recover proteinaceous matter therefrom.

In the processing of protein-containing animal by-products it is often necessary to store the fatty, fleshy material for lengthy periods of time prior to the ultimate treatment thereof such as by hydrolysis with an acid. Such prolonged storage at ambient temperatures produces partial degradation of any fat present in the by-product. As a result, fatty acids are formed and discoloration of the fat as well as emission of unpleasant odors occurs. Heretofore fat breakdown has been largely inhibited by storage under refrigeration. However, maintenance of such "cold storage" is uneconomical particularly in the storage of most animal by-products which are usually of little actual unit value.

It has now been found that animal by-products can be stored for lengthy periods of time, at an ambient temperature such as room temperature or higher, in an aqueous solution of an inorganic acid without detrimentally affecting the fat content of the by-product. Furthermore, the acid used is advantageously that acid which is to be employed for subsequent acid hydrolysis. In this manner, the protein portion of the animal by-product can be conventionally hydrolyzed to the soluble polypeptide state merely by increasing the temperature of the aqueous storage solution and completing the processing as set forth, for example, in Kuster U.S. Pat. No. 3,000,742, issued Sept. 19, 1961. The present invention is preferably directed to the storage of animal by-products for processing as set forth therein. However, the process has application to any animal by-products containing fat which may be degraded by storage at ambient temperatures.

The amount of inorganic acid required to inhibit fat deterioration during storage of untreated by-products is that amount which provides a pH for the resulting solution of about 1–4 and preferably 1.5–2.5. It has been found that about 2–4% by weight of inorganic acid based on the total weight of by-product will produce this desirable environment. Preferably the amount of inorganic acid used for inhibition of fat degradation during prolonged storage is that which corresponds to the amount necessary for subsequent hydrolysis in accordance with U.S. Pat. 3,000,742. Although sulfuric acid, hydrochloric acid and the like may be employed, phosphoric acid is preferred and will be referred to hereinafter.

The storage temperature can be varied, for example, with fluctuations in room temperature between from about 60° to about 80° F. In addition, higher or lower storage temperatures have not been found to adversely affect the conditions produced during prolonged storage. Storage at ambient temperatures is therefore possible even when there is a fluctuation.

In a preferred aspect the animal by-product is comminuted so that the individual pieces do not exceed one inch in any dimension. In this manner, the by-product will be subjected to intimate contact with the acid solution. The size reduction can be accomplished in any conventional manner such as grinding or chopping, or pre-breaking.

Although the description of the invention as hereinafter set forth is devoted principally to butcher-shop trimmings, it will be understood that slaughterhouse offal, poultry viscera and bone trimmings, as well as all other materials generally classified as animal by-products, may be handled in the same manner either separately or together with these trimmings.

To further illustrate the novel process of this invention, the following example is provided. Beef trimmings were obtained from a local butcher shop. The bone was removed. The remaining composition was approximately 85% fat by weight and 15% meat by weight. The raw materials were comminuted into pieces not exceeding about one inch in any dimension and placed in an open vessel. Three percent by weight of commercial phosphoric acid (75–85% phosphoric acid) was added to an amount of water sufficient to cover the raw material in the vessel. A second batch of raw material was placed in a similar vessel filled with water. The materials were stored at room temperature for a period of seven days. Portions of the materials were removed from the storage vessels at interim periods and tested for fatty acid concentration. The test results were as follows:

| Treatment | Storage Time, days | Free fatty acid | Color | Odor |
|---|---|---|---|---|
| Under acid solution [1] | 0 | 1.5 | Light | None. |
| Under acid solution | 3 | 1.4 | do | Do. |
| Do | 5 | 1.5 | do | Do. |
| Do | 7 | 1.7 | do | Do. |
| Under water | 0 | 1.5 | do | Do. |
| Do | 7 | 7.8 | Dark | Strong. |

[1] pH adjusted to 2.2 with commercial phosphoric acid.

The raw materials stored under the phosphoric acid had a free fatty acid level of 1.7 at the end of seven days. The raw material stored under a water solution had a free fatty acid of 7.8 after seven days. The raw materials stored under the dilute phosphoric acid produced no off odors even at the end of the seven-day period. However, odors from the raw materials stored in a plain water solution were sufficiently strong as to be unbearable at the end of three days.

While one embodiment of the invention has been shown and described, it will be apparent that other adaptations and modifications can be made without departing from the true spirit and scope of the invention.

What is claimed is:

1. In a process for hydrolyzing animal by-products having about 85% fat and 15% meat by treating with a hydrolyzing acid at atmospheric pressure and at an elevated temperature under 300° F. until the protein content reaches the polypeptide state of hydrolysis and fat is liquified including the step of prolonged preliminary storage prior to hydrolysis, the improvement comprising storing said by-products for at least about seven days prior to subsequent hydrolysis at ambient temperatures between about 60° and 80° F. under an aqueous solution containing about 2–4% by weight of an inorganic acid of the group consisting of phosphoric, hydrochloric and sulfuric, the acid being the same as the hydrolyzing acid, said solution having a pH of about 1–4.

2. A process in accordance with claim 1 and further characterized by comminuting the animal by-products to a size less than about one inch in all dimensions.

3. A process in accordance with claim 1 wherein said storage is accomplished in an open vessel.

4. A process in accordance with claim 1 wherein the inorganic acid is phosphoric acid.

References Cited

UNITED STATES PATENTS

| | | | |
|---|---|---|---|
| 1,982,907 | 12/1934 | Eckey | 99—163 |
| 1,993,152 | 3/1935 | Eckey | 99—163 |
| 2,619,494 | 11/1952 | Ramsey et al. | 260—415 |
| 2,371,812 | 3/1945 | Ernst | 99—2 |
| 3,113,030 | 12/1963 | Brody | 99—7 |
| 3,115,409 | 12/1963 | Hallinan et al. | 99—7 |
| 3,294,826 | 12/1966 | O'Neill | 260—412.7 |
| 3,301,681 | 1/1967 | Kuster | 99—7 |
| 3,370,954 | 2/1968 | Kuster | 99—7 |

FOREIGN PATENTS 719,629  12/1954  Great Britain.

OTHER REFERENCES

J. of American Oil Chemists, November 1954, vol. XXXI, pp. 538–541.

NORMAN YUDKOFF, Primary Examiner

F. E. DRUMMOND, Assistant Examiner

U.S. Cl. X.R.

99—7, 10, 18, 118, 163